No. 845,929. PATENTED MAR. 5, 1907.
N. BROONOIPPOLITO.
FILTER AND DISTILLER.
APPLICATION FILED DEC. 29, 1906.

2 SHEETS—SHEET 1.

WITNESSES:
Robt F. Dilworth
A. M. Konstanzer

INVENTOR
Nicolas Broonoippolito,
By Edward A. Lawrence,
his ATTORNEY

No. 845,929. PATENTED MAR. 5, 1907.
N. BROONOIPPOLITO.
FILTER AND DISTILLER.
APPLICATION FILED DEC. 29, 1906.

2 SHEETS—SHEET 2.

WITNESSES:
Robt. F. Dilworth
J. H. Harrison

INVENTOR
Nicolas Broonoippolito
By Edward A. Laurence
HIS ATTORNEY

UNITED STATES PATENT OFFICE.

NICOLAS BROONOIPPOLITO, OF ALLEGHENY, PENNSYLVANIA.

FILTER AND DISTILLER.

No. 845,929.          Specification of Letters Patent.          Patented March 5, 1907.

Application filed December 29, 1906. Serial No. 349,942.

*To all whom it may concern:*

Be it known that I, NICOLAS BROONOIPPO-LITO, a citizen of the United States, and residing in the city of Allegheny, in the county of Allegheny and State of Pennsylvania, have invented or discovered new and useful Improvements in Filters and Distillers, of which the following is a specification.

My invention consists in certain new and useful improvements in apparatus for the filtering and distilling of water. I show combined means for performing both of these operations and automatic means for condensing and cooling the product. I also provide automatic means for maintaining the proper level of water in the distilling apparatus and novel construction and arrangement of the various parts of my invention, as will appear by the accompanying description.

Figures 1, 2:
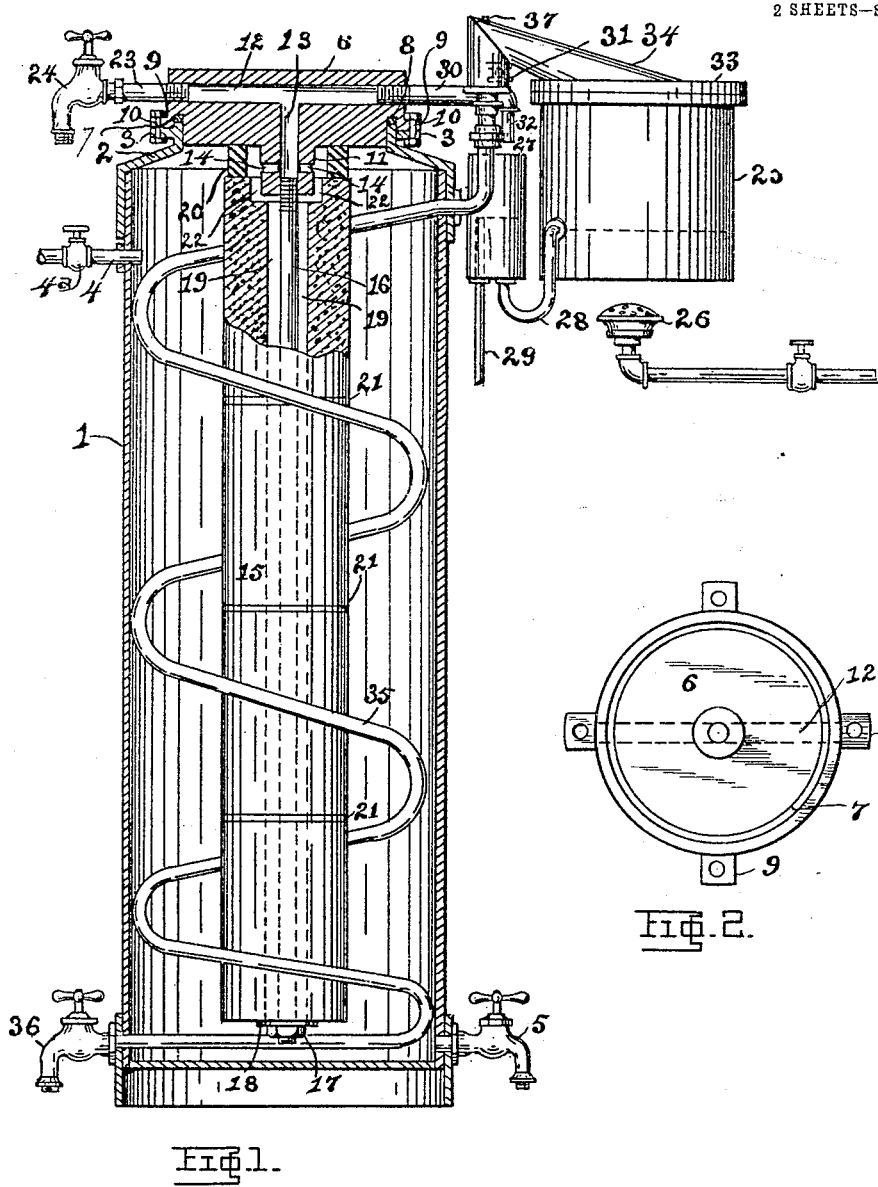
Figure 3:
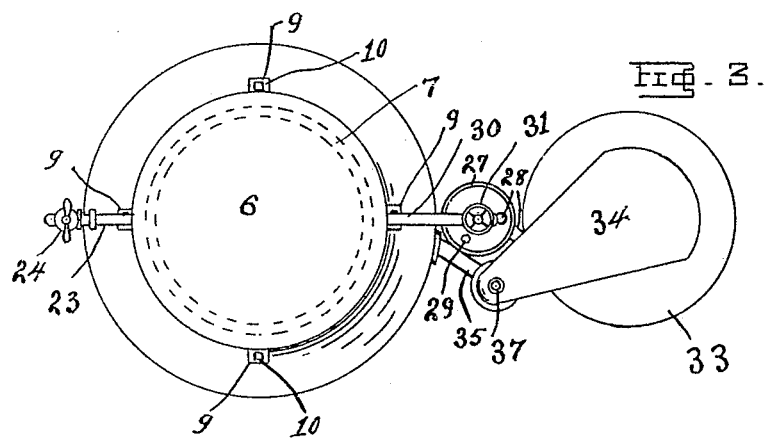
Figure 4:
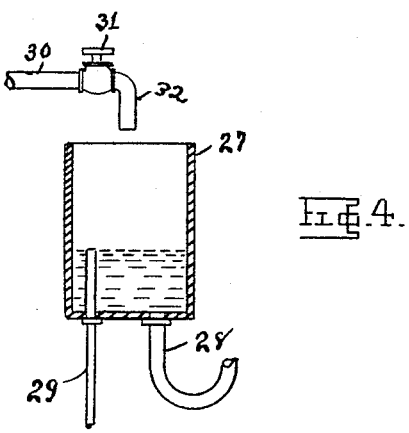

In the accompanying drawings, Figure 1 is an elevation of my combined filter and distiller, the filter-casing being in vertical section and the filter-stone being partially broken away in similar section for the sake of clearness. Fig. 2 is an inverted plan view of the casing-cover. Fig. 3 is a plan view of the invention; and Fig. 4 is a vertical section, on an enlarged scale, of the feed-receptacle.

The following is a detailed description of the drawings:

1 is the filter-casing, formed of copper or other suitable material and preferably of the cylindrical form shown. The capacity of said casing is regulated by the amount of filtered product desired. The upper portion of said casing is preferably contracted conically and provided with annular collar 2 and a plurality of pierced ears 3 3.

4 is the inlet-pipe, communicating with the interior of casing 1 and connected with the service-pipe or other source of water-supply.

4ᵃ is a valve in pipe 4 to control the flow of water through said pipe.

5 is the drain-cock in the wall of casing 1, near the bottom thereof, adapted to empty the water from casing 1 when desired.

6 is the cover, preferably cast of brass or other suitable material and having in its under face the annular groove 7, adapted to receive the annular collar 2 of casing 1. 8 is an annular gasket, of rubber or other suitable material, seated in said groove 7 and adapted to be compressed by the edge of collar 2 to form a water-tight joint between the cover 6 and the casing 1.

9 9 are pierced ears integral with cover 6 and corresponding in number and location with the ears 3 3 of casing 1. 10 10 are bolts passing through pierced ears 3 and 9, thus holding said cover firmly in place.

11 is a central downwardly-depending projection either integral with cover 6 or attached thereto.

12 is a horizontal passage through the center of cover 6 and having its ends threaded to engage pipe ends, to be described.

13 is a vertical passage in cover 6, extending from passage 12 down through projection 11, and 14 14 are one or more ports through the wall of projection 11, communicating with passage 13.

15 15 represent one or more filter-stones, either natural or artificial, which are strung on rod 16, whose upper end is secured in the lower extremity of passage 13 by threaded engagement. Said stone or stones are held in place on said rod 16 by means of nut 17, securing in place washer 18, which also serves to prevent the entrance of water from below into the central bore 19 of the stone or stones 15 15.

20 is an annular gasket, of suitable material, compressed between the top of stone 15 and the under face of cover 6 and surrounding projection 11, thus preventing the entrance of unfiltered water from casing 1 through ports 14 14.

21 21 are gaskets or washers of suitable material interposed between stones 15 15 to prevent the entrance of unfiltered water between the same into the bore 19.

The central bore 19 of the top stone 15 is countersunk or enlarged adjacent to its top to permit free passage of water from said bore 19 around said projection 11 to ports 14 14.

23 is a pipe in threaded engagement with one end of passage 12 and provided with a cock 24 for the withdrawal of filtered water thereby.

25 is a boiler for distilling the water received from the filtering apparatus above described.

26 is a gas-burner or other means for heating the contents of boiler 25. 27 is the feed-receptacle located adjacent to said boiler and connected therewith by feed-pipe 28, leading from the bottom of said receptacle to a point in the side of boiler 25 at the desired water-level therein.

29 is an overflow-pipe extending up into receptacle 27 to a point slightly above the water-level in boiler 25. It is evident that the proper level of water in boiler 25 will be maintained automatically as long as water is fed to receptacle 27, the surplus water not required in boiler 25 being carried off through pipe 29 from receptacle 27.

30 is a pipe in threaded engagement with the other end of passage 12 and provided with suitable valve 31 and downwardly-extending outlet 32, by means of which water may be admitted to receptacle 27.

33 is the cover of boiler 25, secured thereto by any convenient means, (not shown,) and 34 is the outlet-hood integral with or attached to said cover. Said hood is in communication with the end of pipe 35 which enters the interior of casing 1 and forms a condensing-coil about the wall thereof, emerging therefrom adjacent to the bottom of said casing and, if desired, provided at its end with a cock 36.

37 is a small orifice in hood 34 to permit the escape of any gas which may be carried by the steam or vapor arising from boiler 25 through hood 34 on its way into coil 35.

The operation of my improved combined filter and distiller is as follows: The valve $4^a$ is opened to admit water through pipe 4 under pressure, which pressure in casing 1 forces the water contained therein through stones 15 15 into central bore 19, up which around rod 16 it is forced into chamber 22, through ports 14 14, into passage 13, into passage 12, whence it may be drawn for use through cock 24, if desired. If it be desired not only to filter the water, but also to distill the same, the valve 31 is opened, admitting water to receptacle 27 through pipe 30 32. The water will pass from receptacle 27 to boiler 25, as shown, where it will be heated by burner 26 for the generation of steam and vapor, which will pass into hood 34, where it will be relieved of any gas contained therein by means of orifice 37. The steam and vapor will then pass into condensing and cooling coil 35 and issue as filtered and distilled water of perfect purity at the outlet end of said coil 35. It is evident that as long as the gas-burner 26 generates sufficient heat and the valves $4^a$ and 31 and the cock 36 are kept open the working of my filter and distiller will be automatic and continuous, a constant stream of product issuing from the outlet end of coil 35.

The advantage of furnishing filtered water for distillation is that all material held in suspension therein is first filtered out before being admitted to the still or boiler, thus preventing the clogging of the apparatus by the precipitation thereof. The capacity of the filtering or distilling apparatus may be varied according to need. The extreme simplicity and compactness of the device enables it to be manufactured at small cost and particularly adapts it to domestic use, as the space required for its installation is relatively slight. One or more filter-stones may be used, as desired. I prefer a number of smaller stones attached together rather than one single stone; but either construction may be resorted to. If but a small quantity of water is to pass through the filter, one small stone may be used alone.

To cleanse the filter, all that is required is the removal of bolts 10 10, which will allow the cover 6 to be lifted off, taking with it the pendant stones 15 15.

Under usual circumstances the filtered and distilled water emerges from coil 35 at a comparatively low temperature; but should the water in casing 1 fail to properly cool the condensed water in coil 35 then drain-cock 5 may be left partially open, thus more rapidly replacing the water standing in casing 1 with fresh cooler water from pipe 4.

While I have minutely described the construction illustrated in the accompanying drawings, I do not limit myself thereby, but claim broadly—

1. In the character of apparatus described, a filter, a distiller adjacent thereto, means for supplying the product of said filter to said distiller and means contained within said filter for condensing and cooling the product of said distiller.

2. In the character of apparatus described, a casing, filtering means contained within said casing, a water-supply connected with said casing, a distiller adjacent to said casing, means for supplying the product of said filtering means to said distiller and a condensing-coil within said casing connected with said distiller.

3. In the character of apparatus described, a casing, filtering means contained in said casing, a water-supply connected with said casing, a distiller, means for automatically supplying the product of said filtering means to said distiller and a condensing-coil connected with said distiller and surrounding said filtering means within said casing.

4. In the character of apparatus described, a casing, filtering means contained in said casing, a water-supply connected with said casing, a distiller, means for automatically maintaining a proper supply of filtered water from said filtering means in said distiller and a condensing-coil within said casing and connected to said distiller.

5. In the character of apparatus described, a casing, a cover secured to said casing, a projection rigid with said cover and depending within said casing, filtering means attached to said cover, a passage carried by said cover, a second passage through said projection and communicating with said first passage, a compartment surrounding said projection, a port connecting said compartment with said
5 second passage and means whereby the product of said filtering means is forced into said compartment.

Signed at Pittsburg, Pennsylvania, this 27th day of December, 1906.

NICOLAS BROONOIPPOLITO.

Witnesses:
J. H. HARRISON,
EDWARD A. LAWRENCE.